United States Patent [19]

Baczuk et al.

[11] 4,386,978

[45] Jun. 7, 1983

[54] CROSSLINKED SINGLE OR DOUBLE BASE PROPELLANT BINDERS

[75] Inventors: Robert J. Baczuk, Salt Lake City, Utah; Anderson E. Robinson, Jr., Destin, Fla.

[73] Assignee: Hercules Incorporated, Wilmington, Del.

[21] Appl. No.: 186,081

[22] Filed: Sep. 11, 1980

[51] Int. Cl.³ .............................................. C06G 45/10
[52] U.S. Cl. .................................. 149/19.4; 149/19.8; 149/88; 149/92; 149/94; 149/95; 149/102
[58] Field of Search ...................... 149/19.4, 19.8, 94, 149/95, 92, 88, 102

[56] References Cited

U.S. PATENT DOCUMENTS 3,956,890  5/1976  Davis ................................. 60/219
4,234,364  11/1980  Robinson ........................... 149/19.4

Primary Examiner—Stephen J. Lechert, Jr.
Attorney, Agent, or Firm—Hazel L. Deming

[57] ABSTRACT

A crosslinked binder for crosslinked single and double base propellant is provided. The binder is prepared from nitrocellulose, certain polyester diols which contain both aliphatic and aromatic ester functionality and a polyfunctional isocyanate having an NCO functionality of at least three. The propellant prepared from the binder exhibits improved mechanical property aging characteristics under conditions of high humidity.

6 Claims, No Drawings

CROSSLINKED SINGLE OR DOUBLE BASE PROPELLANT BINDERS

This invention relates to improved crosslinked binder compositions for crosslinked single and double base propellants. The improved crosslinked binder compositions of this invention provide crosslinked propellants exhibiting improved mechanical property aging characteristics under conditions of high humidity.

Crosslinked double base (XLDB) propellants comprising a polyester or polyether polyurethane rubber binder plasticized with a nitrate ester and filled with particulate solid fuels and oxidizer are known and described, for example, in U.S. Pat. No. 3,956,890 to Davis and U.S. patent application Ser. No. 910,792, filed May 30, 1978, to Robinson. The polyurethane rubber binder employed by Davis and by Robinson in such propellants comprise nitrocellulose and a low molecular weight polyester or polyether polyol crosslinked with a polyisocyanate, the polyester polyol being the condensation product of a polyhydric alkanol and an aliphatic dicarboxylic acid and typically a low molecular weight polyethylene glycol adipate.

It is well recognized in the polyurethane art that polyester based polyurethanes are appreciably less stable to hydrolytic degradation then polyether based polyurethanes and that they exhibit greater loss of physical properties under humid conditions than do the corresponding polyether based polyurethanes. This susceptibility to hydrolysis has severely limited the utility of the polyester polyurethanes and except in those cases where contact with moisture is minimum, it has not been possible to realize the full extent of their outstanding physical properties. The undesirable consequences of hydrolytic instability have also been found to affect the physical properties and performance characteristic of propellant compositions of which the polyester polyurethane binders form a part and hence the advantages associated with the outstanding ability of these binders to retain large amounts of nitrate ester plasticizer and particularly nitroglycerin are offset by the reduction in physical properties which occurs upon aging in humid environments.

It is an object of this invention to provide an improved crosslinked binder composition for crosslinked single and double base propellant having improved mechanical property aging characteristics under high humidity environments over the state of the art crosslinked propellant binder compositions.

It is another object of this invention to provide an improved polyester based polyurethane rubber binder composition for use in crosslinked single and double base propellant compositions in which significant improvement in the high humidity aging characteristics can be achieved while maintaining excellent ballistic behavior.

It has now been discovered that when certain polyester diols which contain both aliphatic and aromatic ester functionality are used to form the crosslinked polyester polyurethane rubber binder for crosslinked single and double base propellant systems, improvements in the stabilization of the propellants to aging in the presence of high humidity result and hence that significant improvement in the ballistic behavior can be achieved. While not bound by any theory, it is believed that the improved properties result from an increase in the hydrophobic nature of the polymer linkages between ester groupings while maintaining sufficient polymer polarity to provide an appropriate solubility parameter so that energetic plasticizers are retained in the propellant matrix and syneresis does not occur.

The polyester diols which are employed to form the crosslinked binders of this invention are low molecular weight, liquid to waxy solid, hydroxyl terminated condensation products of an aliphatic diol containing 5 to 9 carbon atoms and a dicarboxylic acid function of which from 10 to 90 and preferably from 30 to 50 mole % is a phthalic acid and from 90 to 10 and preferably from 70 to 50 mole % is at least one aliphatic dicarboxylic acid containing from 5 to 9 carbon atoms. The diol component is typically 2,2-dimethyl-1,3-propanediol, 1,5-pentanediol, 1,6-hexanediol, 1,3-hexanediol and the like. Phthalic acid (ortho) is the preferred phthalic acid although isophthalic acid (meta) and terephthalic acid (para) or mixtures thereof are also suitable. Preferably, the aliphatic dicarboxylic acid component of the polyester diol is glutaric, adipic, pimelic or suberic acid or mixtures of any two or more of these acids. The polyester diols have an average hydroxyl functionality of at least about 1.9, are well known to the art and are prepared conventionally using an excess of the diol to provide hydroxyl termination. The preferred polyester diols will have an average molecular weight ranging from about 1,000 to 10,000 and more preferably from about 2,000 to 5,000, melting points within the range of about 30° to about 50° C., a viscosity of about 4,000 to about 11,000 cps. at 60° C., an acid number below about 1.5 mg KOH/gram and a hydroxyl functionality of 2.

The nitrocellulose which can be employed to form the crosslinked binder of this invention is propellant grade nitrocellulose and preferably has an intrinsic viscosity of at least about 0.40 deciliters/gram and a calculated molecular weight range of from about 14,000 to about 68,000. The weight ratio of nitrocellulose to polyester diol in the binder is preferably from about 0.15 to about 0.001. Typical nitrocellulose materials which can be employed in the binder compositions of this invention are more fully described in Table I below.

TABLE I

| Nitrocellulose Type[1] | Approx. Nitrogen (Wt. %) | Calculated Molecular Weight[2] | Approx. Intrinsic Viscosity dl/gram[3] | Solution Viscosity[4] |
|---|---|---|---|---|
| RS 18-25 cps | 12.0 | 14,000 | 0.40 | 18-25 cps (12.2% soln.) |
| RS ¼ sec. | 12.0 | 22,000 | 0.55 | 4-5 sec. (25% soln.) |
| RS ½ sec. | 12.0 | 33,000 | 0.72 | 3-4 sec. (20% soln.) |
| RS ¾ sec. | 12.0 | 42,000 | 0.88 | 6-8 sec. (20% soln.) |
| RS 5-6 sec. | 12.0 | 68,000 | 1.47 | 5-6.5 Sec. (12.2% soln.) |
| Pyrocotton | 12.6 | 120,000 | >2 | 15 sec. (10% soln.) |
| Guncotton | 13.4 | 120,000 | >2 | 15 sec. (10% soln.) |
| SS ¼ sec. | 11.0 | 22,000 | 0.55 | 4-5 sec. (25% soln.) |
| SS ½ sec. | 11.0 | 33,000 | 0.72 | 3-4 sec. (20% soln.) |
| SS 5-6 sec. | 11.0 | 42,000 | 1.47 | 5-6.5 sec. (12.2% soln.) |
| AS ½ sec. | 11.5 | — | — | 5-6.5 sec. |

TABLE I-continued

| Nitrocellulose Type[1] | Approx. Nitrogen (Wt. %) | Calculated Molecular Weight[2] | Approx. Intrinsic Viscosity dl/gram[3] | Solution Viscosity[4] (12.7% soln.) |
|---|---|---|---|---|

[1]RS, SS and AS type designations for nitrocellulose specifically refer to designations used by Hercules Incorporated for nitrocellulose grade sold by Hercules Incorporated. An "RS" type nitrocellulose indicates solubility of the nitrocellulose in esters such as ethyl and butyl acetates, in ketones and glycol ethers. An "SS" type nitrocellulose indicates solubility of the nitrocellulose in mixtures of alcohol and toluene. An "AS" type nitrocellulose is desirable when alcohol rather than hydrocarbon is used as diluent. See "Nitrocellulose, Properties and Uses", Hercules Powder Company, (1955), particularly pages 8–12.
[2]Molecular weight calculated from intrinsic viscosity values. See article entitled "Intrinsic Viscosity of Nitrocellulose", C. H. Lindsley and M. B. Frank, Industrial and Engineering Chemistry, November 1953, pp.2491-2497.
[3]Intrinsic Viscosity determined using acetone solvent.
[4]Solution viscosity is measured by the Falling Ball Method using as the solvent a mixture comprising by weight, 20% ethyl acetate, 25% denatured ethyl alcohol and 55% toluene.

The polyfunctional isocyanates which can be employed in the new improved urethane binder composition of this invention have a NCO functionality of at least 3. Particularly suitable isocyanates having a functionality of at least 3 are aliphatic isocyanates such as the isocyanate available commercially from Baychem Corporation and sold under the trade DESMODUR, N-100. Aromatic isocyanates having an NCO functionality of greater than 3 are available as a high molecular weight fraction of polymethylene polyphenyl isocyanates from which diisocyanate molecules in the mixture have been removed. Such materials are available commercially under the trade designation PAPI from the Upjohn Company.

In formulating the urethane binder composition of this invention the effective urethane stoichiometry should be not less than about 1.0. To achieve such stoichiometry considering the presence of various ingredients within the propellant formulation capable of reaction with the isocyanate, it is usually necessary to formulate the binder composition to higher stoichiometries based on the isocyanate. Thus, in the propellant composition of this invention the ratio of isocyanate functional groups to the combined hydroxyl functionality of the polyester diol and nitrocellulose is from about 1/1 to about 1.5/1.

The preparation of a crosslinked double base propellant employing the urethane binder of this invention generally entails the preparation of an energetic plasticizer/binder premix at a weight ratio of plasticizer/binder mainly determined by ballistic considerations and usually at a plasticizer/binder weight ratio of less than about 4.5/1 and more preferably from about 2/1 to about 3.5/1. This premix is added to the propellant mix bowl, warmed to the appropriate mix temperature and then the solid ingredients are added. Finally, the isocyanate curative is added with the catalyst and the propellant is mixed to evenly disperse the ingredients.

The examples which follow more fully illustrate the improved urethane rubber binders of this invention and crosslinked double base propellant compositions prepared from these urethane rubber binders.

EXAMPLE 1

A propellant composition utilizing the urethane binder system of this invention was prepared in the following manner.

Nitrocellulose, suitable stabilizers, and a hydroxyl terminated polyester diol based on hexanediol and an adipic/ortho-phthalic acid function (mole ratio 70/30) were dissolved in nitroglycerin (plasticizer) to produce a homogeneous fluid lacquer. The polyester diol was the waxy solid polyester sold by Hooker Chemical Corp. under the trade designation RUCOFLEX S-1019-35 and had a nominal molecular weight of 3,200, a melting range of 40°–50° C., a hydroxyl functionality of 2 and a viscosity range of 6,100 to 11,000 cps. at 60° C. The lacquer was sparged with dry nitrogen to remove moisture and other volatiles. This operation was carried out at low elevated temperature (up to about 50° C.) with premelting of the polyester diol. The polyfunctional isocyanate and the particulate solid fuels and oxidizers were then added and mixed into the lacquer to produce a castable slurry. This operation was carried out at low elevated temperatures (up to about 60° C.). Finally, the urethane catalyst was added to the slurry and mixed and the completed mix was then cast into a suitable mold, placed in an oven operated at low elevated temperature (up to about 60° C.) and cured for a period of about seven days.

Following the procedure described above, a control propellant composition (prior art) was prepared utilizing a urethane rubber binder prepared from a liquid, medium viscosity polyester diol based on diethylene glycol and adipic acid (polyethylene glycol adipate sold by Hooker Chemical Corp. under the trade designation RUCOFLEX S-1011-35) having a nominal molecular weight of 3200 and a hydroxyl functionality of 2. The compositions of these propellant formulations were

| Ingredient | Control Propellant (% by Weight) | Propellant of Example 1 (% by Weight) |
|---|---|---|
| Nitroglycerin | 18 | 18 |
| Polyester diol | 6 | 6 |
| Nitrocellulose (RS 5–6 sec.) | 0.2 | 0.2 |
| Polyisocyanate[a] | 1 | 1 |
| Propellant solids | 75 | 75 |

[a]DESMODUR, N-100; NCO functionality of 4–4.5

These propellants were each cast into a JANAF tensile specimen mold and the samples were cured at 49° C. for seven days. One-quarter inch JANAF tensile specimens were cut from the cured propellant samples. The specimens were next preconditioned at 25° C. for 7 days at 50% relative humidity and then wrapped with several layers of aluminum foil and taped. Several of these wrapped specimens were tested for 2-inch per minute zero-time uniaxial tensile measurements. The remaining specimens were placed in an aluminum desiccator containing a glycerol-water reservoir of such a concentration to produce a relative humidity of 50% at 60° C. (ASTM E104-51). At first biweekly and then at monthly intervals, specimens were removed and placed in a conditioning desiccator over $CaSO_4$ for ten days at room temperature. Specimens were then removed and uniaxial tensile measurements made (specimens were reconditioned to 45% relative humidity at 24° C. prior to testing).

Table II below compares the 2-inch per minute uniaxial tensile behavior of the Control Propellant and the Propellant of this example aged at 60° C. and 50% relative humidity.

TABLE II

Mechanical Property Aging Data

| Aging Sequence Weeks | Tensile Strength, psi | Young's Modulus, psi |
|---|---|---|
| Control Propellant | | |
| Initial | 68.4 | 404 |
| 2.6 | 61.9 | 315 |
| 4 | 57.1 | 272 |
| 6 | 59.6 | 197 |
| 8 | 50.6 | 220 |
| 21.7 | 20.0 | 49 |
| First order aging rate constant per week | −0.058 | −0.096 |
| Propellant of Example 1 | | |
| Initial | 63.4 | 256 |
| 2 | 63.3 | 214 |
| 4 | 58.9 | 222 |
| 6 | 63.9 | 232 |
| 8 | 57.6 | 234 |
| 12 | 56.3 | 192 |
| First order aging rate constant per week | −0.0037 | −0.016 |

In addition, tensile strength data were obtained for wrapped specimens aged at 70°, 60°, 49° and 40° C. at 10, 25, 50 and 65% relative humidity and the data (first order stress aging rate) were extrapolated to determine the time (effective service life) at which a 20% loss in maximum stress would be realized at 50% relative humidity and temperatures of 26.8° C. (80° F.) and 32.2° C. (90° F.). The service life for the control propellant and the propellant of this example are reported in Table III.

TABLE III

Service Life Comparison

| Propellant | Calculated Activation Energy | Life, Years at 26.7° C. | Life, Years at 32.2° C. |
|---|---|---|---|
| Control | 26.9 | 27 | 14 |
| Example 1 | 22.2 | 187 | 93 |

EXAMPLE 2

The mixing procedure of Example 1 was repeated utilizing a urethane binder prepared from nitrocellulose, a hydroxyl terminated polyester diol based on hexanediol and an adipic/ortho-phthalic acid function (mole ratio 50/50) and the polyisocyanate crosslinking agent. The polyester diol used in this example was the soft waxy solid polyester sold by Hooker Chemical Corp. under the trade designation RUCOFLEX S-1014-55 and had a nominal molecular weight of 2000, a melting range of 30° to 40° C., a hydroxyl functionality 2 and a viscosity of 4000–6500 cps. at 60° C.

A control propellant composition was also prepared in the same manner using the polyester diol described for the control of Example 1. The compositions of these propellant formulations were

| Ingredient | Control Propellant (% by Weight) | Propellant of Example 2 (% by Weight) |
|---|---|---|
| Nitroglycerin | 20 | 19.5 |
| Polyester diol | 6.5 | 6.5 |
| Nitrocellulose (RS 5-6 sec.) | 0.2 | 0.2 |
| Polyisocyanate[a] | 1.2 | 1.5 |
| Propellant solids | 70 | 70 |

[a]DESMODUR, N100; NCO functionality of 4–4.5

These propellants were each cast into a JANAF tensile specimen mold and the samples were cured at 49° C. for seven days. One-quarter inch JANAF tensile specimens were cut from the cured propellant samples. Several of the specimens were placed in a conditioning dessicator over $CaSO_4$ for 10 days at room temperature and then tested for 2-inch per minute zero-time uniaxial tensile behavior. The remaining specimens were placed in an aluminum dessicator containing a glycerol-water reservoir of such a concentration to provide a relative humidity of 50% at 60° C. At monthly intervals specimens were removed and were placed in a conditioning dessicator over $CaSO_4$ for 10 days at room temperature and then uniaxial tensile measurements were made.

Table IV below compares the 2-inch per minute uniaxial tensile behavior of the control propellant and the propellant of this example.

TABLE IV

Mechanical Property Aging Data

| Aging Sequence Weeks | Tensile Strength, psi | Young's Modulus, psi |
|---|---|---|
| Control Propellant | | |
| Initial | 106 | 546 |
| 4 | 88 | 286 |
| 8 | 68 | 167 |
| 12 | 50 | 97 |
| 16 | 28 | 54 |
| First order aging rate constant per week | −0.0806 | −0.0143 |
| Propellant of Example 2 | | |
| Initial | 97 | 590 |
| 4 | 93 | 470 |
| 8 | 90 | 462 |
| 12 | 87 | 413 |
| 16 | 91 | 588 |
| 21.5 | 91 | 497 |
| First order aging rate constant per week | −0.0023 | −0.0019 |

The improved crosslinked binders of this invention provide crosslinked single and double base propellants having improved mechanical quality, reliability and safety over the state of the art crosslinked propellants and are particularly effective in double base propellant compositions in which the solids loading is high, i.e., about 70% or greater. In such propellants the binder system usually comprises from about 4 to about 10% and preferably from 5 to 7% by weight of the crosslinked double base propellant composition.

The energetic plasticizer most commonly employed in crosslinked double base propellants is nitroglycerin. Other energetic plasticizers which can be employed include liquid nitroesters such as diethylene glycol dinitrate, triethylene glycol dinitrate, and butanetriol trinitrate, bis(dinitropropyl)acetal, bis(dinitropropyl)formal, and the like. These energetic plasticizers are generally employed in an amount of from about 15% to about 25% by weight based on the weight of the propellant. Energetic plasticizers are stabilized primarily with 2-nitrodiphenylamine, N-methyl p-nitroaniline, or mixtures thereof.

Crosslinked propellant compositions also contain solid oxidizers usually in an amount from 45 to 55% based on the weight of the propellant. Illustrative oxidizers employed in the crosslinked double base propellants include by way of illustration, inorganic oxidizers such as ammonium perchlorate and sodium perchlorate, and organic oxidizers such as cyclotetramethylene tetranitramine (HMX), and cyclotrimethylene trinitramine (RDX), and mixtures of organic and inorganic oxidizers.

The crosslinked double base propellants can contain a variety of fuels, ballistic modifiers, stabilizers and the like which are commonly employed in composite modifed double base propellant compositions.

What we claim and desire to protect by Letters Patent is:

1. In a crosslinked binder suitable as the binder portion of a crosslinked single or double base propellant composition in which the crosslinked binder is a urethane rubber comprising the reaction product of nitrocellulose, a low molecular weight polyester diol and a polyfunctional isocyanate having an NCO functionality of at least 3, the improvement comprising a polyester diol prepared from an aliphatic diol containing 5 to 9 carbon atoms and a dicarboxylic acid function of which from 10 to 90 mole % is a phthalic acid and from 90 to 10 mole % is at least one aliphatic dicarboxylic acid containing from 5 to 9 carbon atoms.

2. The crosslinked binder of claim 1 in which the aliphatic dicarboxylic acid is adipic acid.

3. The crosslinked binder of claim 2 in which the aliphatic diol is hexanediol.

4. The crosslinked binder of claim 3 in which the phthalic acid is ortho-phthalic acid.

5. The crosslinked binder of claim 3 in which the orthophthalic acid is from 30 to 50 mole % of the dicarboxylic acid function.

6. In a crosslinked double base propellant composition comprising an energetic liquid nitroester plasticizer, organic and inorganic oxidizing agents, fuels, and a crosslinked binder, the improvement comprising as the crosslinked binder the urethane rubber of claim 1.

* * * * *